(12) United States Patent
Chiu et al.

(10) Patent No.: US 12,548,149 B2
(45) Date of Patent: Feb. 10, 2026

(54) MULTISTREAM FUSION ENCODER FOR PROSTATE LESION SEGMENTATION AND CLASSIFICATION

(71) Applicant: City University of Hong Kong, Hong Kong (HK)

(72) Inventors: Bernard Chi Yuen Chiu, Hong Kong (HK); Carmen C.M. Cho, Hong Kong (HK); Baohua Yuan, Taizhou (CN); Mingjie Jiang, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 540 days.

(21) Appl. No.: 17/980,561

(22) Filed: Nov. 4, 2022

(65) Prior Publication Data

US 2023/0162353 A1 May 25, 2023

Related U.S. Application Data

(60) Provisional application No. 63/282,636, filed on Nov. 23, 2021.

(51) Int. Cl.
*G06T 7/00* (2017.01)
*G06T 7/11* (2017.01)
(Continued)

(52) U.S. Cl.
CPC .............. *G06T 7/0012* (2013.01); *G06T 7/11* (2017.01); *G06T 9/00* (2013.01); *G06V 10/28* (2022.01);
(Continued)

(58) Field of Classification Search
CPC .......... G06T 7/0012; G06T 7/11; G06T 9/00; G06V 10/28; G06V 10/764; G06V 10/771; G06V 10/82
See application file for complete search history.

(56) References Cited

U.S. PATENT DOCUMENTS

2020/0214619 A1* 7/2020 Leng ................. G06T 7/11

FOREIGN PATENT DOCUMENTS

WO    WO-2020028382 A1 * 2/2020 ........... A61B 6/5211

OTHER PUBLICATIONS

I. Chan, W. Wells, 3rd, R. V. Mulkern, S. Haker, J. Zhang, K. H. Zou, S. E. Maier, and C. M. Tempany, "Detection of prostate cancer by integration of line-scan diffusion, T2-mapping and T2-weighted magnetic resonance imaging; a multichannel statistical classifier," Med Phys, vol. 30, No. 9, pp. 2390-2398, Sep. 2003.
(Continued)

*Primary Examiner* — John R Wallace
(74) *Attorney, Agent, or Firm* — Idea Intellectual Limited; Sam T. Yip

(57) ABSTRACT

The present invention provides a flexible, light-weighted and efficient multistream fusion encoder which can be easily integrated into multistream convolutional neural networks to perform segmentation and classification tasks on MRI images registered with different modalities. The encoder allows fusion of extracted feature maps in multiple streams on a layer-by-layer basis and generates the output of each stream by adding the corresponding convolutional output with an adaptively weighted fusion map computed from outputs of all streams. Adaptive weighting of fusion maps at each layer allows flexibility in highlighting different image modalities according to their relative influence on the segmentation/classification performance. The fusion encoder can also play an important role in the segmentation-classification workflow in biopsy and focal therapy planning.

16 Claims, 11 Drawing Sheets

(51) Int. Cl.

| | |
|---|---|
| G06T 9/00 | (2006.01) |
| G06V 10/28 | (2022.01) |
| G06V 10/764 | (2022.01) |
| G06V 10/771 | (2022.01) |
| G06V 10/82 | (2022.01) |

(52) U.S. Cl.
CPC .......... *G06V 10/764* (2022.01); *G06V 10/771* (2022.01); *G06V 10/82* (2022.01); *G06T 2207/10088* (2013.01); *G06T 2207/30081* (2013.01)

(56) References Cited

OTHER PUBLICATIONS

S. Ozer, D. L. Langer, X. Liu, M. A. Haider, T. H. van der Kwast, A. J. Evans, Y. Yang, M. N. Wernick, and I. S. Yetik, "Supervised and unsupervised methods for prostate cancer segmentation with multispectral MRI," Med Phys, vol. 37, No. 4, pp. 1873-1883, Apr. 2010.

X. Liu, D. L. Langer, M. A. Haider, Y. Yang, M. N. Wernick, and I. S. Yetik, "Prostate cancer segmentation with simultaneous estimation of Markov random field parameters and class," IEEE Trans Med Imaging, vol. 28, No. 6, pp. 906-915, Jun. 2009.

Y. Artan, M. A. Haider, D. L. Langer, T. H. van der Kwast, A. J. Evans, Y. Yang, M. N. Wernick, J. Trachtenberg, and I. S. Yetik, "Prostate cancer localization with multispectral MRI using cost-sensitive support vector machines and conditional random fields," IEEE Trans Image Process, vol. 19, No. 9, pp. 2444-2455, Sep. 2010.

Y. Artan and I. S. Yetik, "Prostate cancer localization using multiparametric MRI based on semi-supervised techniques with automated seed initialization," IEEE Trans Inf Technol Biomed, vol. 16, No. 6, pp. 1313-1323, Nov. 2012.

J. C. Weinreb, J. O. Barentsz, P. L. Choyke, F. Cornud, M. A. Haider, K. J. Macura, D. Margolis, M. D. Schnall, F. Shtern, C. M. Tempany, H. C. Thoeny, and S. Verma, "PI-RADS Prostate Imaging—Reporting and Data System: 2015, Version 2," Eur Urol, vol. 69, No. 1, pp. 16-40, Jan. 2016.

S. Kohl, D. Bonekamp, H.-P. Schlemmer, K. Yaqubi, M. Hohenfellner, B. Hadaschik, J.-P. Radtke, and K. Maier-Hein, "Adversarial networks for the detection of aggressive prostate cancer," arXiv preprint arXiv:1702.08014, 2017.

C. De Vente, P. Vos, M. Hosseinzadeh, J. Pluim, and M. Veta, "Deep Learning Regression for Prostate Cancer Detection and Grading in Bi-parametric MRI," IEEE Trans Biomed Eng, May 8, 2020.

J. I. Epstein, M. J. Zelefsky, D. D. Sjoberg, J. B. Nelson, L. Egevad, C. Magi-Galluzzi, A. J. Vickers, A. V. Parwani, V. E. Reuter, S. W. Fine, J. A. Eastham, P. Wiklund, M. Han, C. A. Reddy, J. P. Ciezki, T. Nyberg, and E. A. Klein, "A Contemporary Prostate Cancer Grading System: A Validated Alternative to the Gleason Score," Eur Urol, vol. 69, No. 3, pp. 428-435, Mar. 2016.

Y. Zhang, O. Morel., M. Blanchon, R. Seulin., M. Rastgoo., and D. Sidibe., "Exploration of Deep Learning-based Multimodal Fusion for Semantic Road Scene Segmentation," in Proceedings of the 14th International Joint Conference on VISAPP, 2019, pp. 336-343.

P. C. Vos, T. Hambrock, J. O. Barentsz, and H. J. Huisman, "Computer-assisted analysis of peripheral zone prostate lesions using T2-weighted and dynamic contrast enhanced T1-weighted MRI," Phys Med Biol, vol. 55, No. 6, pp. 1719-1734, Mar. 21, 2010.

P. C. Vos, T. Hambrock, C. A. Hulsbergen-van de Kaa, J. J. Futterer, J. O. Barentsz, and H. J. Huisman, "Computerized analysis of prostate lesions in the peripheral zone using dynamic contrast enhanced MRI," Med Phys, vol. 35, No. 3, pp. 888-899, Mar. 2008.

E. Niaf, O. Rouviere, F. Mege-Lechevallier, F. Bratan, and C. Lartizien, "Computer-aided diagnosis of prostate cancer In the peripheral zone using multiparametric MRI," Phys Med Biol, vol. 57, No. 12, pp. 3833-3851, Jun. 21, 2012.

Alqahtani, S., Wei, C., Zhang, Y., Szewczyk-Bieda, M., Wilson, J., Huang, Z., Nabi, G., 2020. Prediction of prostate cancer gleason score upgrading from biopsy to radical prostatectomy using pre-biopsy multiparametric mri pirads scoring system. Scientific reports 10, 1-9.

Barentsz, J.O., Richenberg, J., Clements, R., Choyke, P., Verma, S., Villeirs, G., Rouviere, O., Logager, V., Futterer, J.J., 2012. ESUR prostate mr guidelines 2012. European radiology 22, 746-757.

Chen, Y., Xing, L., Yu, L., Bagshaw, H.P., Buyyounouski, M.K., Han, B., 2020. Automatic intraprostatic lesion segmentation in multiparametric magnetic resonance images with proposed multiple branch UNet. Medical physics 47, 6421-6429.

Cohen, J., 1968. Weighted kappa: nominal scale agreement with provision for scaled disagreement or partial credit. Psychology Bulletin, 70, 213a 220.

Dickinson, L., Ahmed, H.U., Allen, C., Barentsz, J.O., Carey, B., Futterer, J.J., Heijmink, S.W., Hoskin, P.J., Kirkham, A., Padhani, A.R., et al., 2011. Magnetic resonance imaging for the detection, localisation, and characterisation of prostate cancer. recommendations from a european consensus meeting. European Urology 59, 477-494.

He, K., Zhang, X., Ren, S., Sun, J., 2016. Deep residual learning for image recognition, in: Proceedings of the IEEE conference on computer vision and pattern recognition, pp. 770-778.

Julien, Le, Nobin, Andrew, B., Rosenkrantz, Arnauld, Villers, Cl'ement, Orczyk, 2015. Image guided focal therapy for magnetic resonance imaging visible prostate cancer: Defining a 3-dimensional treatment margin based on magnetic resonance imaging histology co-registration analysis. Journal of Urology.

Kamnitsas, K., Ledig, C., Newcombe, V.F., Simpson, J.P., Kane, A.D., Menon, D.K., Rueckert, D., Glocker, B., 2017. Efficient multi-scale 3D Cnn with fully connected CRF for accurate brain lesion segmentation. Medical image analysis 36, 61-78.

Kasivisvanathan, V., Rannikko, A.S., Borghi, M., Panebianco, V., Mynderse, L.A., Vaarala, M.H., Briganti, A., Budaus, L., Hellawell, G., Hindley, R.G., et al., 2018. MRI-targeted or standard biopsy for prostate-cancer diagnosis. New England Journal of Medicine 378, 1767-1777.

Kohestani, K., Wallstrom, J., Dehlfors, N., Sponga, O.M., Mansson, M., Josefsson, A., Carlsson, S., Hellstrom, M., Hugosson, J., 2019. Performance and interobserver variability of prostate mri (pi-rads version 2) outside high-volume centres. Scandinavian journal of urology 53, 304-311.

Langer, D.L., Van der Kwast, T.H., Evans, A.J., Trachtenberg, J., Wilson, B.C., Haider, M.A., 2009. Prostate cancer detection with multi-parametric MRI: Logistic regression analysis of quantitative T2, diffusion-weighted imaging, and dynamic contrast-enhanced MRI. Journal of Magnetic Resonance Imaging: An Official Journal of the International Society for Magnetic Resonance in Medicine 30, 327-334.

Van der Leest, M., Cornel, E., Israel, B., Hendriks, R., Padhani, A.R., Hoogenboom, M., Zamecnik, P., Bakker, D., Setiasti, A.Y., Veltman, J., et al., 2019. Head-to head comparison of transrectal ultrasound-guided prostate biopsy versus multiparametric prostate resonance imaging with subsequent magnetic resonance-guided biopsy in biopsy- haive men with elevated prostate-specific antigen: a large prospective multicenter clinical study. European urology 75, 570-578.

Litjens, G., Kooi, T., Bejnordi, B.E., Setio, A.A.A., Ciompi, F., Ghafoorian, M., Van Der Laak, J.A., Van Ginneken, B., Sanchez, C.I., 2017. A survey on deep learning in medical image analysis. Medical image analysis 42, 60-88.

Meyer, A., Rakr, M., Schindele, D., Blaschke, S., Schostak, M., Fedorov, A., Hansen, C., Towards patient-individual pi-rads V2 sector map: CNN for automatic segmentation of prostatic zones from T2-weighted MRI, in: 2019 IEEE 16th International Symposium on Biomedical Imaging (ISBI 2019), IEEE. pp. 696-700.

Moeskops, P., Viergever, M.A., Mendrik, A.M., De Vries, L.S., Benders, M.J., Isgum, I., 2016. Automatic segmentation of mr brain images with a convolutional neural network. IEEE transactions on medical imaging 35, 1252-1261.

Mottet, N., Bellmunt, J., Bolla, M., Briers, E., Cumberbatch, M.G., De Santis, M., Fossati, N., Gross, T., Henry, A.M., Joniau, S., et al.,

(56) References Cited

OTHER PUBLICATIONS

2017. EAU guidelines on prostate cancer. part 1: screening, diagnosis, and local treatment with curative intent. European urology 71, 618-629.

Muller, B.G., Shih, J.H., Sankineni, S., Marko, J., Rais-Bahrami, S., George, A.K., de la Rosette, J.J., Merino, M.J., Wood, B.J., Pinto, P., et al., 2015. Prostate cancer: interobserver agreement and accuracy with the revised prostate maging reporting and data system at multiparametric mr imaging. Radiology 277, 741-750.

Murphy, K.P., 2012. Machine learning: a probabilistic perspective. MIT press.

Nie, D., Wang, L., Gao, Y., Shen, D., Fully convolutional networks for multi-modality isointense infant brain image segmentation, in: 2016 IEEE 13Th international symposium on biomedical imaging (Isbi), IEEE. pp. 1342-1345.

Nobin, J.L., Orczyk, C., Deng, F.M., Melamed, J., Rusinek, H., Taneja, S.S., Rosenkrantz, A.B., 2015. Prostate tumour vols. evaluation of the agreement between magnetic resonance imaging and histology using novel co-registration software. BJUInternational 114, E105-E112.

Ronneberger, O., Fischer, P., Brox, T., 2015. U-net: Convolutional networks for biomedical image segmentation, in: International Conference on Medical image computing and computer-assisted intervention, Springer. pp. 234-241.

Salehi, S.S.M., Erdogmus, D., Gholipour, A., 2017. Tversky loss function for image segmentation using 3D fully convolutional deep networks, in: International workshop on machine learning in medical imaging, Springer. pp. 379-387.

Siegel, R., Miller, K., Jemal, A., 2016. Cancer facts & figures 2016, American cancer society.(2016). Atlanta, Georgia , 1-72.

Simonyan, K., Zisserman, A., 2014. Very deep convolutional networks for large-scale image recognition. arXiv preprint arXiv:1409.1556 .

Song, Y., Zhang, L., Chen, S., Ni, D., Lei, B., Wang, T., 2015. Accurate segmentation of cervical cytoplasm and nuclei based on multiscale convolutional network and graph partitioning. IEEE Transactions on Biomedical Engineering 62, 2421-2433.

Stanzione, A., Imbriaco, M., Cocozza, S., Fusco, F., Rusconi, G., Nappi, C., Mirone, V., Mangiapia, F., Brunetti, A., Ragozzino, A., et al., 2017. Erratum to "biparametric 3T magnetic resonance imaging for prostatic cancer detection in a biopsy-na ive patient population: A further improvement of PI-RADS v2? [Eur. J. Radiol. 85 (12)(2016) 2269-2274]". European journal of radiology 87, 125.

Thestrup, K.C.D., Logager, V., Baslev, I., Møller, J.M., Hansen, R.H., Thomsen, H.S., 2016. Biparametric versus multiparametric mri in the diagnosis of prostate cancer. Acta radiologica open 5, 2058460116663046.

Tsehay, Y.K., Lay, N.S., Roth, H.R., Wang, X., Kwak, J.T., Turkbey, B.I., Pinto, P.A., Wood, B.J., Summers, R.M., 2017. Convolutional neural network based deep-learning architecture for prostate cancer detection on multiparametric magnetic resonance images, in: Medical Imaging 2017: Computer-Aided Diagnosis, International Society for Optics and Photonics. p. 1013405.

Valerio, M., Cerantola, Y., Eggener, S.E., Lepor, H., Polascik, T.J., Villers, A., Emberton, M., 2017. New and established technology in focal ablation of the prostate: a systematic review. European urology 71, 17-34.

Weinreb, J.C., Barentsz, J.O., Choyke, P.L., Cornud, F., Haider, M.A., Macura, K.J., Margolis, D., Schnall, M.D., Shtern, F., Tempany, C.M., et al., 2016. PI-RADS prostate imaging-reporting and data system: 2015, version 2. European urology 69, 16-40.

Xiao, X., Lian, S., Luo, Z., Li, S., 2018. Weighted res-unet for high-quality retina vessel segmentation, in: 2018 9th International conference on information technology in medicine and education (ITME), IEEE. pp. 327-331.

Yang, X., Liu, C., Wang, Z., Yang, J., Le Min, H., Wang, L., Cheng, K.T.T., 2017. Co-trained convolutional neural hetworks for automated detection of prostate cancer in multi-parametric MRI. Medical image analysis 42, 212-227.

Yaniv, Z., Lowekamp, B.C., Johnson, H.J., Beare, R., 2018. SimpleITK Image-Analysis Notebooks: a Collaborative Environment for Education and Reproducible Research. Journal of digital imaging 31, 290-303.

\* cited by examiner

MULTISTREAM FUSION ENCODER FOR PROSTATE LESION SEGMENTATION AND CLASSIFICATION

FIELD OF THE INVENTION

The present invention relates to a multistream fusion encoder which can be embedded into segmentation and classification networks for prostate lesion diagnosis. The encoder is light-weight and computationally efficient.

BACKGROUND

MRI-targeted biopsy is becoming the standard of care for diagnosing prostate cancer in developed countries. Lesion segmentation is a prerequisite of MRI-targeted biopsy. Beyond its role in the biopsy workflow, lesion segmentation is also required for any form of focal prostate cancer therapies, such as high-intensity focused ultrasound, cryotherapy, or brachytherapy, which aim to treat localized prostate cancer while not exposing the patients to risks associated with aggressive treatments. Although lesion segmentation can be performed manually, manual segmentation is laborious and prone to observer variability.

Besides lesion detection and identification, lesion classification for risk assessment is also important in the pre-biopsy workflow. Lesion classification is required to triage patients for biopsy. Despite the establishment of Prostate Imaging Reporting and Data System (PI-RADS), a consensus guideline on interpreting and reporting findings in multiparametric MRI (mpMRI) developed by radiologists from the European Society of Urogenital Radiology (ESUR) and the American College of Radiology (ACR), there is still a limited agreement in mpMRI interpretation between radiologists with different levels of expertise. More importantly, while the PI-RADS score assigned by a radiologist indicates how likely the lesion is clinically significant, a radiologist is not able to assign a Gleason grade for a lesion based on mpMRI observations. Although there is a correlation between PI-RADS score and Gleason grade, the Gleason grade can only be reliably obtained from biopsies.

Although the PI-RADS version 2 guideline recommended the use of the T2-weighted (T2W), diffusion-weighted imaging (DWI) and dynamic contrast-enhanced (DCE) sequence for localization and detection of prostate lesions, DCE imaging only plays a minor role in assessing the clinical significance of peripheral zone lesions when they are equivocally suspected by DWI. Since the establishment of PI-RADS v2, it has been reported that biparametric MRI (bpMRI), involving only T2W and DWI, has similar diagnostic accuracy compared to mpMRI, while the acquisition time required by bpMRI is just 17 minutes, compared to 45 minutes required for mpMRI. Besides, a physician is required to monitor the potential of allergic reactions in a DCE scanning session, thereby increasing the imaging cost. From the perspectives of substantial saving in imaging time and cost, bpMRI is a strong alternative to mpMRI.

Most of previous work in prostate segmentation and classification from bpMRI involves stacking images acquired from two pulse sequences, T2W and DWI, into a convolutional neural network (CNN). This approach is more prone to overfitting as the increased dimensions in the input space stemming from image stacking increases the model complexity.

A multistream architecture to localize prostate lesions weakly supervised by a binary image-based tag was recently proposed for indicating the presence/absence of lesion(s). Features were independently extracted from T2W and apparent diffusion coefficient (ADC) images to generate an activation map for each stream, with the ADC activation map used as the lesion localization result. This method focuses more on determining a rough location of the lesion and not on providing an accurate segmentation for prostate lesions. The activation map obtained through weak-supervision by an image-level tag does not provide sufficient accuracy to benefit prostate biopsy.

In the multistream networks such as VGG, ResNet, U-Net, and ResUNet, merging of different streams was performed after features have been extracted. However, there is no interaction between different branches in intermediate layers leading up to the final feature representation. As the complexity of the feature maps increase with the depth of the layer, communication of different branches at each layer with corresponding depth in a multistream network enhances the quality of feature maps in the following layer. Propagation of these improved feature maps along the pipeline is expected to improve segmentation performance.

Therefore, there is a need for a flexible, light-weighted, and computationally efficient architecture allowing fusion of different streams layer-by-layer and integrable into the existing multistream network constructed from conventional segmentation and classification networks. There is also a need for an automated method capable of predicting the Gleason grade with high accuracy in the absence of human intervention that will benefit patient management.

SUMMARY OF THE INVENTION

Accordingly, in a first aspect, the present invention provides a multistream fusion encoder for encoding a set of MRI images registered with a plurality of MRI modalities. The multistream fusion encoder comprises: a plurality of feature extractors, each configured to extract a feature map for a corresponding MRI modality; a fusion map generator configured to generate a fusion map based on the plurality of extracted feature maps; a weighting operator configured to generate, based on the fusion map, a plurality of weighted fusion maps for the plurality of MRI modalities respectively; and a plurality of fusion operators, each configured to generate, based on a corresponding extracted feature map and a corresponding weighted fusion map, a corresponding fusion-encoded feature map.

In a second aspect, the present invention provides a multistream neural network for performing lesion segmentation and classification on a set of MRI images registered with a plurality of MRI modalities. The multistream neural network comprises multiple layers of multistream fusion encoders of claim 1 arranged to form a plurality of encoder paths to encode the set of MRI images on a layer-by-layer basis and generate a plurality of fusion-encoded feature maps corresponding to the plurality of MRI modalities respectively.

In a third aspect, the present invention provides an automatic method for performing lesion segmentation and classification on a set of MRI images registered with a plurality of MRI modalities. The automatic method includes encoding, by a plurality of multistream fusion encoders of claim 1, the set of MRI images on a layer-by-layer basis to generate a plurality of fusion-encoded feature maps corresponding to the plurality of MRI modalities respectively.

The major highlight of the multistream fusion encoder is that it integrates features extracted in every corresponding layer by different streams and allows the combined features to propagate to the next layer. This strategy is in sharp contrast to previously proposed multistream networks that combined the output of each stream at the last layer of the network, while each stream worked independently in previous layers.

The multistream neural network embedded with the fusion encoder provided in the present invention has been trained and evaluated by incorporating information available in T2W, ADC and high b-value DW images in lesion segmentation and classification from multiparametric prostate MR imaging. The evaluation results show that the fusion encoder is flexible, light-weighted, and efficient, and can be easily embedded in multistream CNN of various architectures to improve segmentation and classification performances. The multistream CNN embedded with the fusion encoder of the present invention has the ability to segment suspicious but lower grade lesions, which is important in planning the location to be sampled in MRI-targeted biopsies. Segmentation of suspicious lesions that are later found out to be benign is also important for accurate classification of the lesions from mpMRI.

BRIEF DESCRIPTION OF THE DRAWINGS

Embodiments of the invention are described in more details hereinafter with reference to the drawings, in which.

DETAILED DESCRIPTION OF THE INVENTION

In the following description, systems, networks, any components thereof, and related methods for performing lesion segmentation and/or classification of segmented lesions, and the likes, are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
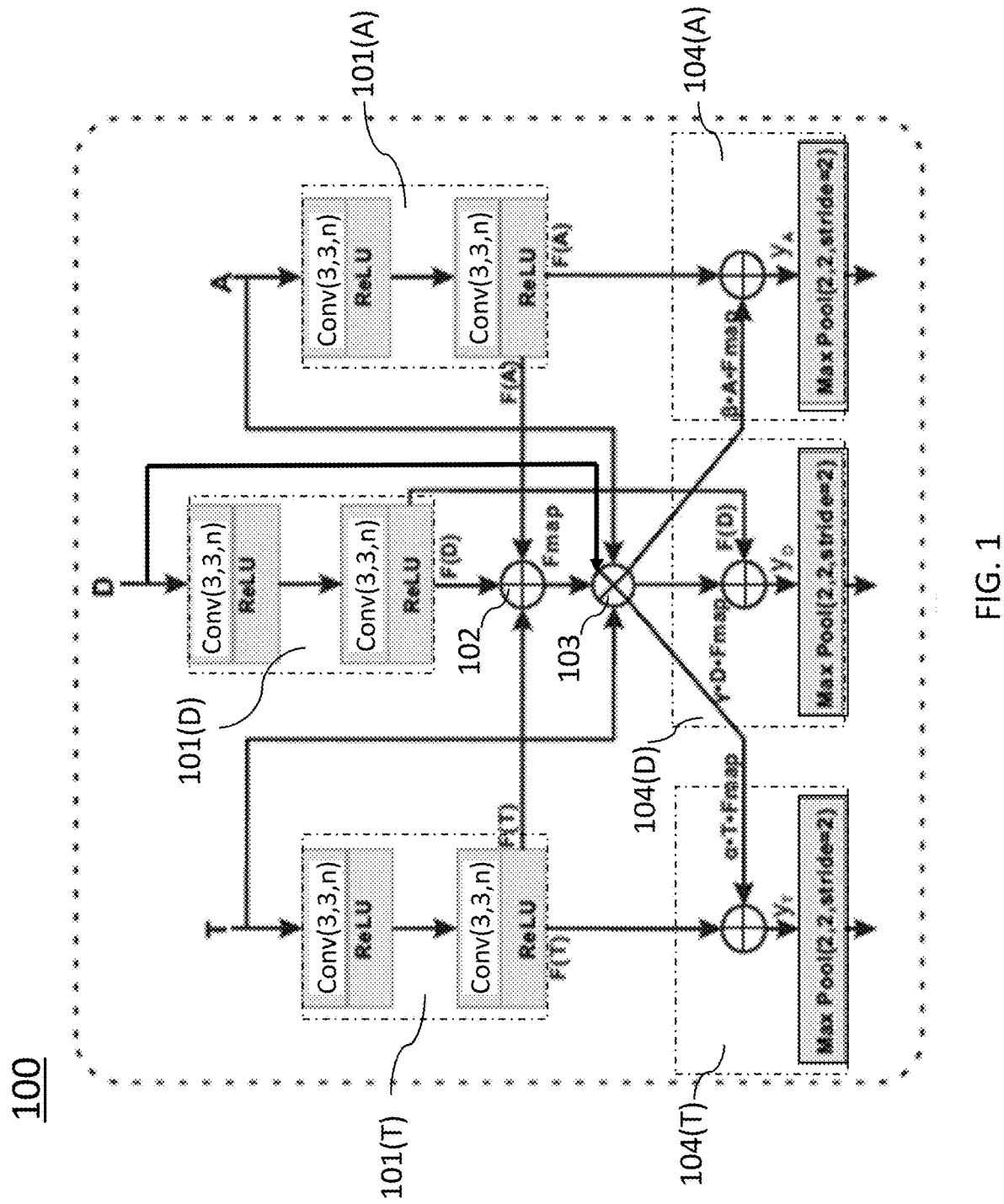
FIG. 1 shows structure of a multistream fusion encoder for encoding a set of MRI images registered with different MRI modalities according to one embodiment of the present invention.

FIG. 1 shows structure of a multistream fusion encoder 100 for encoding a set of MRI images registered with different MRI modalities according to one embodiment of the present invention. The multistream fusion encoder 100 may be structured to have different streams corresponding to the different MRI modalities respectively. By way of example, the multistream fusion encoder 100 of FIG. 1 is depicted to have three streams corresponding to three MRI modalities: T2W, ADC and DWI, denoted by T, A, and D, respectively. It should be appreciated that the multistream fusion encoder 100 can also include other streams for processing other MRI modalities.

The multistream fusion encoder 100 may comprise a plurality of feature extractors 101(T), 101(A) and 101(D), each configured to extract a feature map, denoted by F(T), F(A) and F(D) respectively, for a corresponding MRI modality T, A, and D. In other words, the features maps F(T), F(A) and F(D), are independently generated in the three streams of the multistream fusion encoder 100.

Each of the feature extractors 101(T), 101(A) and 101(D) may include a first 2D convolution block and a second 2D convolution block following the first 2D convolution block. The 2D convolution blocks are denoted as Conv (x, y, n), where x and y specify the height and the width of the 2D convolution block (or window); n is the number of channels in the output. The $i^{th}$ channel of T, A, D, F(T), F(A) and F(D) are denoted by $T_i$, $A_i$, $D_i$, $F_i(T)$, $F_i(A)$ and $F_i(D)$, respectively. Each of the convolution blocks may have a rectified linear unit ReLU applied with a non-linear activation function that outputs the maximum values between zero and the input value.

The multistream fusion encoder 100 may further comprise a fusion map generator 102 configured to generate a fusion map $F_{map}$ based on the plurality of extracted feature maps F(T), F(A) and F(D).

In some embodiments, the fusion map $F_{map}$ may be generated by adding the averages of feature maps F(T), F(A) and F(D) taken along the channel dimension:

$$F_{map} = \frac{1}{n}\sum_{k=1}^{n} F_i(T) + \frac{1}{n}\sum_{k=1}^{n} F_i(A) + \frac{1}{n}\sum_{k=1}^{n} F_i(D) \qquad (1)$$

The multistream fusion encoder 100 may further comprise a weighting operator 103 configured to generate, based on the fusion map $F_{map}$, a plurality of weighted fusion maps for the plurality of MRI modalities respectively.

In some embodiments, the weighted fusion maps may be generated by assigning a plurality of weights to the plurality of MRI modalities T, A and D respectively; and multiplying each of the assigned weights with a corresponding extracted feature map and the fusion map. That is, the weighted fusion maps for the MRI modalities T, A and D may be given by:

$$F_{map}(A) = \alpha \cdot A_i \cdot F_{map}$$

$$F_{map}(T) = \beta \cdot T_i \cdot F_{map}$$

$$F_{map}(D) = \gamma \cdot D_i \cdot F_{map} \qquad (2)$$

where $F_{map}(A)$, $F_{map}(T)$ and $F_{map}(D)$ are the weighted fusion maps corresponding to the three modalities A, T and D. α, β and γ are the constants representing the weights of $F_{map}$ assigned to the three modalities A, T and D and α++=1. In some embodiments, the weight parameters α, β and γ may be optimized adaptively through backpropagation just like convolution filters.

The multistream fusion encoder 100 may further comprise a plurality of fusion operators 104(T), 104(A) and 104(D). Each of the fusion operators 104(T), 104(A) and 104(D) may be configured to generate a fusion-encoded feature map based on a corresponding extracted feature map and a corresponding weighted fusion map.

For each of the MRI modalities T, A and D, its corresponding weight fusion map and extracted feature map may be added to generate an intermediate feature maps $y_A$, $y_T$ and $y_D$ respectively. That is, a channel i of intermediate feature maps $y_A$, $y_T$ and $y_D$, denoted by $y_{i,A}$, $y_{i,T}$ and $y_{i,D}$, may be computed by:

$$y_{i,A} = F_i(A) + \alpha \cdot A_i \cdot F_{map}$$

$$y_{i,T} = F_i(T) + \beta \cdot T_i \cdot F_{map}$$

$$y_{i,D} = F_i(D) + \gamma \cdot D_i \cdot F_{map} \quad (3)$$

Maximum pooling is then performed on each of the intermediate feature maps to generate the fusion-encoded feature map.

Figure 2:
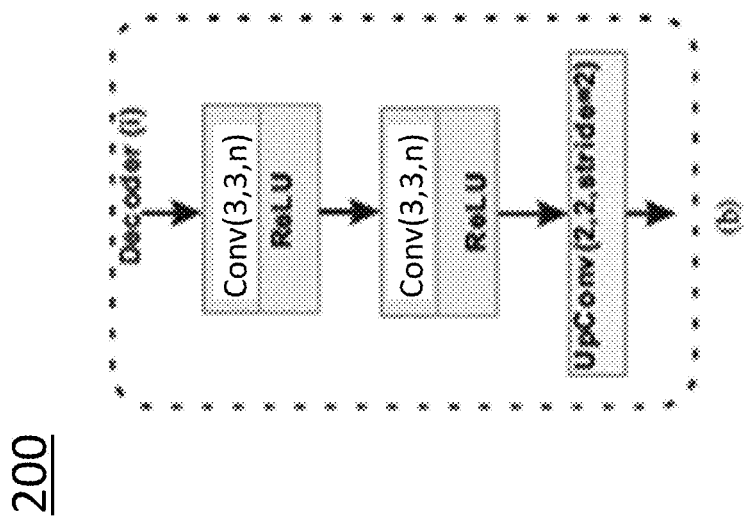
FIG. 2 shows structure of a decoder used for decoding fusion-encoded feature maps according to one embodiment of the present invention.

FIG. 2 shows an internal structure of a decoder 200 used for decoding the fusion-encoded feature maps. As shown, each decoder 200 may include a first 2D convolution block and a second 2D convolution block following the first 2D convolution block. The 2D convolution blocks are denoted as Conv (x, y, n), where x and y specify the height and the width of the 2D convolution block (or window); n is the number of channels in the output. Each of the 2D convolution blocks may have a rectified linear unit ReLU applied with a non-linear activation function that outputs the maximum values between zero and the input value. The decoder 200 may further include an up-convolution block, denoted by upConv, for upsampling the feature maps.

The multistream fusion encoder 100 can be embedded in various CNN segmentation and classification architectures to form a multistream lesion segmentation and/or classification network. For example, a multistream fusion U-Net (MSFusion-UNet) may be formed by embedding one or more multistream fusion encoders 100 in a U-Net structure. The MSFusion-UNet may consist of different streams which are fed with MRI images registered in different modalities, respectively.

Figure 3:
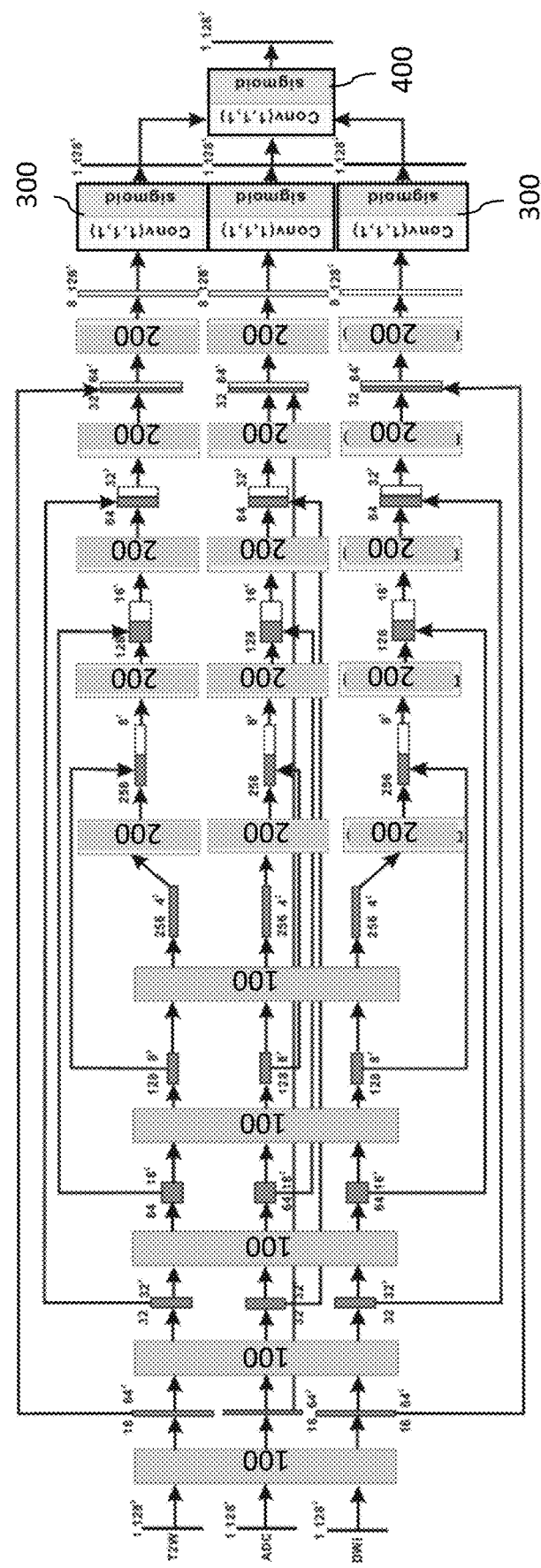
FIG. 3 shows a multistream neural network used for performing lesion segmentation on a set of MRI images registered with different MRI modalities according to one embodiment of the invention.

FIG. 3 shows a multistream neural network 10 used for performing lesion segmentation on a set of MRI images registered with different MRI modalities according to one embodiment of the invention. As shown, the multistream neural network 10 includes three different streams, the T2W, ADC and DWI streams, which are fed with registered T2W, ADC and DWI images, respectively.

The multistream neural network 10 is embedded with multiple layers of multistream fusion encoders 100 arranged to form respective encoder paths in the T2W, ADC and DWI streams to encode the set of MRI images on a layer-by-layer basis and generate different fusion-encoded feature maps corresponding to the different MRI modalities respectively.

The outputs of the encoder paths were decoded independently using multiple layers of U-Net decoders 200 wherein each layer includes different decoders corresponding to the different MRI modalities respectively. As shown, the U-Net decoders 200 are arranged to form respective decoder paths in the T2W, ADC and DWI streams to decode the different fusion-encoded feature maps on a layer-by-layer basis and generate different decoded feature maps corresponding to the different MRI modalities respectively.

At the end of the decoder paths, an intermediate classification layer comprising a plurality of intermediate classifiers 300 are arranged to form respective classification paths in the T2W, ADC and DWI streams to generate a plurality of intermediate lesion probability maps corresponding to the plurality of MRI modalities respectively. Each intermediate classifier 300 may include a 2D convolution block and a sigmoid classifier.

Following the intermediate classification layer, a final classifier 400 is used to concatenate and compress the intermediate probability maps generated in the T2W, ADC and DWI streams into a one-channel combined probability map. The final classifier 400 may include a 2D convolution block and a sigmoid classifier. A final segmentation map is then generated by binarizing the combined probability map using a threshold. In some embodiments, the threshold may be set to 0.5. The probability was either very close to 0 or 1, so the segmentation map did not vary for a large range of thresholding probabilities.

In some embodiments, the multistream neural network 10 may perform pixel-by-pixel classification task involving a highly unbalanced data set, that is, the number of pixels with lesions is much smaller than that without lesions. False negatives and false positives in the unbalanced data may be balanced using the following Tversky loss function such that the segmentation map can be optimized:

$$\mathcal{L}(p, \hat{p}) = \frac{\sum_{i=1}^{N} p_i \hat{p}_i}{\sum_{i=1}^{N} p_i \hat{p}_i + \beta \sum_{i=1}^{N} p_i (1 - \hat{p}_i) + (1 - \beta) \sum_{i=1}^{N} (1 - p_i) \hat{p}_i} \quad (4)$$

where pi=1 if pixel i is inside a manually segmented lesion; otherwise, pi=0. p̂i is the predicted probability of pixel i being inside a lesion. β is set to be 0.6 so that false negatives are penalized more.

Figure 4:
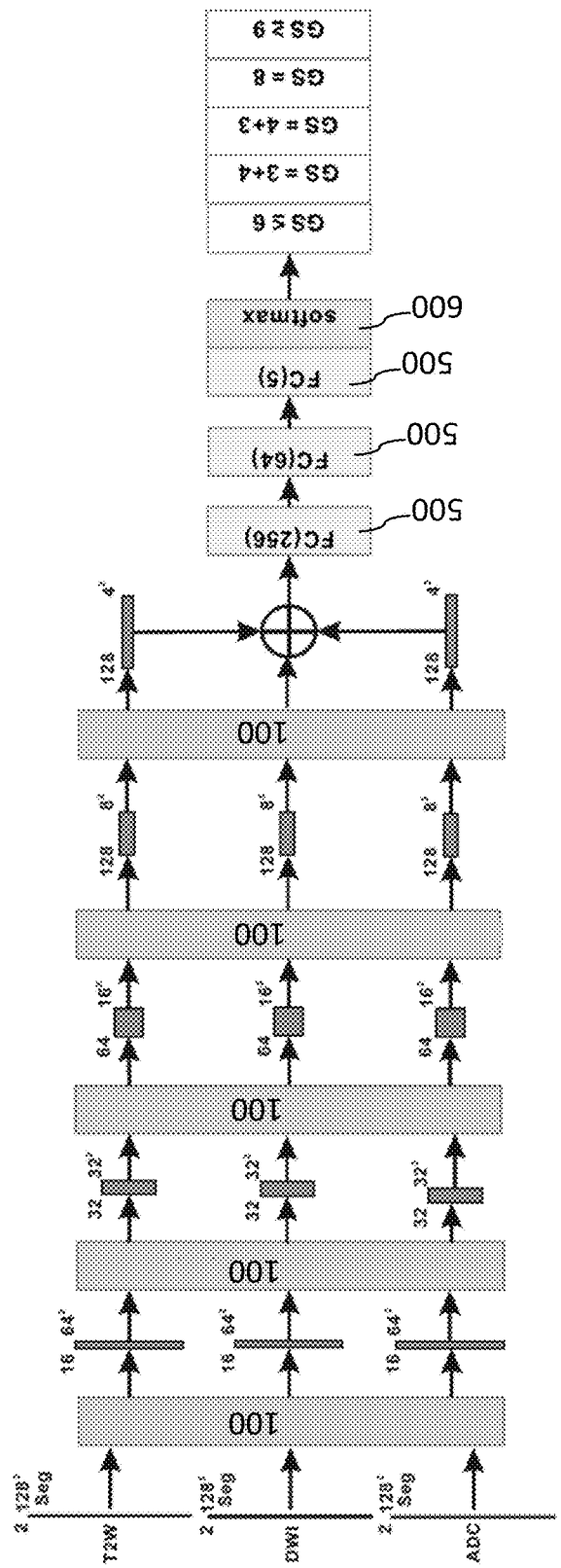
FIG. 4 shows a multistream neural network used for performing lesion classification on a set of MRI images registered with different MRI modalities according to another embodiment of the invention.

FIG. 4 shows a multistream neural network 20 used for performing lesion classification on a set of MRI images registered with different MRI modalities according to another embodiment of the invention. The multistream neural network 20 may have a visual geometry group (VGG) network architecture. Similar to the multistream neural network 10, the multistream neural network 20 includes three different streams, the T2W, ADC and DWI streams, which are fed with registered T2W, ADC and DWI images, respectively.

The multistream neural network 20 is also embedded with multiple layers of multistream fusion encoders 100 arranged to form respective encoder paths in the T2W, ADC and DWI streams to encode the set of MRI images on a layer-by-layer basis and generate different fusion-encoded feature maps corresponding to the different MRI modalities respectively.

The multistream neural network 20 may further include a series of fully-connected neurons 500 configured to flatten, concatenate and process the plurality of fusion-encoded feature maps in a layer-by-layer manner. The multistream neural network 20 may further include a multi-class classifier 600, such as a softmax classifier, following the series of fully-connected neurons and configured to normalize the processed fusion-encoded feature maps to a distribution of lesion probabilities and predict a Gleason grade for the set of MRI images.

In some embodiments, the multistream neural network 20 may be trained or optimized using the cross-entropy loss function:

$$\mathcal{L}_{CE} = -\Sigma_{i=1}^{c} t_i \log(s_i) \qquad (5)$$

where $t_i \in \{0, 1\}$ indicates whether the sample belongs to the $i^{th}$ class; $s_i \in [0, 1]$ is the algorithm-generated probability for $i^{th}$ category; c is the number of classes.

Figure 5:
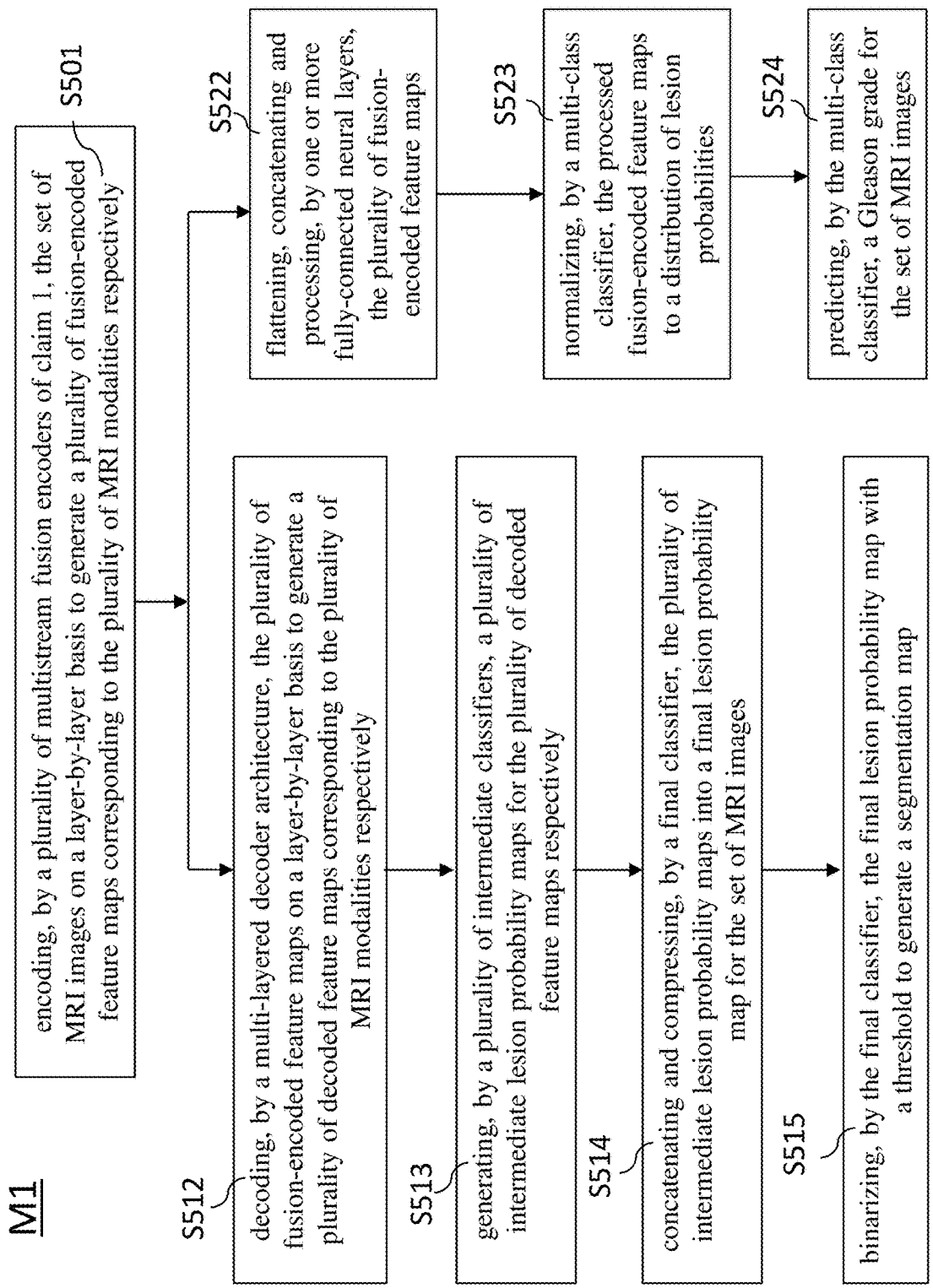
FIG. 5 shows a flow chart of an automatic method for performing lesion segmentation and classification on a set of MRI images registered with a plurality of MRI modalities according to one embodiment of the present invention.

FIG. 5 shows a flow chart of an automatic method M1 for performing lesion segmentation and classification on a set of MRI images registered with a plurality of MRI modalities according to one embodiment of the present invention. The automatic method may comprise step S501: encoding, by a plurality of multistream fusion encoders of claim 1, the set of MRI images on a layer-by-layer basis to generate a plurality of fusion-encoded feature maps corresponding to the plurality of MRI modalities respectively.

For performing lesion segmentation, the automatic method M1 may further comprise the following steps:

S512: decoding, by a multi-layered decoder architecture, the plurality of fusion-encoded feature maps on a layer-by-layer basis to generate a plurality of decoded feature maps corresponding to the plurality of MRI modalities respectively;

S513: generating, by a plurality of intermediate classifiers, a plurality of intermediate lesion probability maps for the plurality of decoded feature maps respectively;

S514: concatenating and compressing, by a final classifier, the plurality of intermediate lesion probability maps into a final lesion probability map for the set of MRI images; and S515: binarizing, by the final classifier, the final lesion probability map with a threshold to generate a segmentation map.

For performing lesion classification, the automatic method M1 may further comprise the following steps:

S522: flattening, concatenating and processing, by one or more fully-connected neural layers, the plurality of fusion-encoded feature maps;

S523: normalizing, by a multi-class classifier, the processed fusion-encoded feature maps to a distribution of lesion probabilities;

S524: predicting, by the multi-class classifier, a Gleason grade for the set of MRI images.

Performance Enhancement Evaluation for Lesion Segmentation:

Prostate lesion segmentation from bpMRI was performed in the following experimental settings to evaluate the improvement attributable to (i) the multistream CNN architecture of FIG. 3 and (ii) the fusion encoder in FIG. 1. The performance of different CNN architectures when implemented under the multistream frameworks was also evaluated. A multiple branch UNet (MB-UNet) proposed for prostate lesion segmentation, which is implemented as a 2.5D network involving three neighbouring image slices, is also used in the evaluation.

As a fair comparison focusing on the evaluation of two-dimensional multistream networks, the performance of a two-dimensional version of MB-UNet was compared with the proposed network using the same data set. In total, seven models were evaluated. The improvement attributable to the multistream CNN framework was quantified by the comparison of the single- and multistream U-Net (denoted by SS-UNet and MS-UNet, respectively). The single-stream UNet is just the original U-Net, with the T2W, ADC and high b-value DW images stacked together to form a three-stream input.

Figure 6:
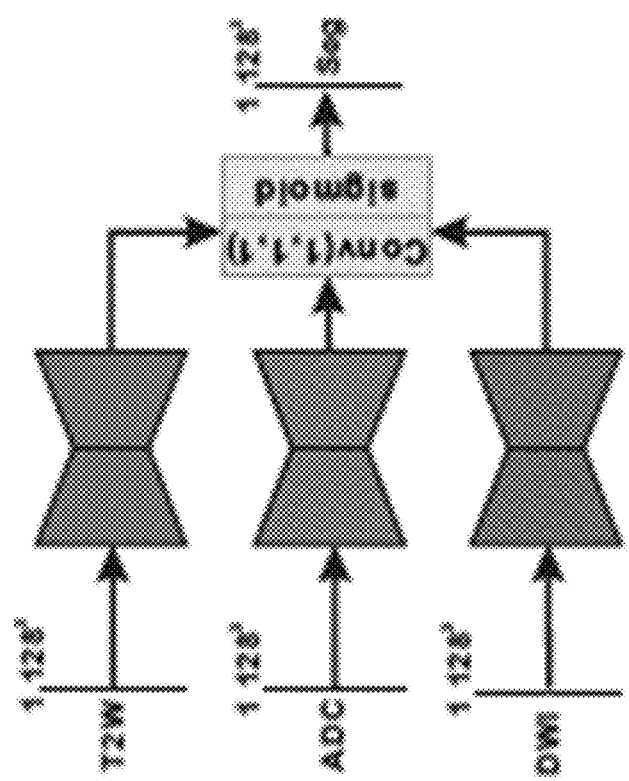
FIG. 6 depicts general structure of a multistream U-Net and ResUNet of a segmentation network used for performance evaluation.

FIG. 6 depicts general structure of the multistream U-Net and ResUNet of the present segmentation network used for performance evaluation. As shown, the structure of the multistream network includes an encoder-decoder pair for processing the three modalities independently. The final segmentation was generated by processing the three output feature maps by a pixel-wise 1D convolution followed by the sigmoid activation function. In MS-UNet, the U-Net architecture was applied in each stream shown in FIG. 6. Similarly, MS-ResUNet is the multistream model constructed with the ResUNet, instead of U-Net, applied in each stream. The difference between MS-UNet and the previously proposed MB-UNet was at the locations where feature maps were fused. Each modality in MS-UNet was processed by an individual encoder-decoder pair before the three final maps generated by the decoder were fused. In contrast, feature maps generated by the three individual encoders in MB-UNet were concatenated before they were fed to a single decoder.

The contribution of the multistream fusion encoder was quantified through the following two comparisons: (1) MS-UNet vs. MSFusion-UNet and (2) MS-ResUNet vs. MSFusion-ResUNet. The MSFusion-UNet is formed by connecting one or more multistream fusion encoders in a U-Net structure. MSFusion-ResUNet was connected similarly but with residual connections.

Performance Enhancement Evaluation for Lesion Classification:

A similar evaluation was done for the lesion classification network of FIG. 4. A total OF six models were evaluated: (1) the single-stream VGG (SS-VGG), (2) the multistream VGG (MS-VGG) and (3) the multistream VGG with the fusion encoder module (MSFusion-VGG). (4) the single-stream ResNet (SS-ResNet), (5) the multi-stream ResNet (MS-ResNet) and (6) the multi-stream ResNet with the fusion encoder module (MSFusion-ResNet).

Lesions are categorized according to the Gleason Grade Group, which classifies lesions to Grades 1 to 5, corresponding to a Gleason score of 6, 3+4, 4+3, 8 and 9. In this study, lesions with a PI-RADS score lower than 3 were of low risk and not biopsied. These lesions were merged with Grade 1 lesions.

Referring back to FIG. 4. Since the size of the input image (128×128) is smaller than the input size of the conventional VGG, the size of the network is adapted to the network size. In each of the T2W, ADC and DWI streams, the MR image was concatenated with the corresponding manual segmentation and fed into the network. The fusion encoder module integrates feature maps generated in the three streams, just as in lesion segmentation. A 4×4×128 volume was generated by each of the three streams after being processed by five fusion encoders. The volumes were then flattened, concatenated and processed by three fully connected layers with 256, 64 and 5 neurons, respectively. The softmax function was then used to normalize the outputs to probabilities and the lesion was classified into the class with the maximum probability.

Preparation of Evaluation Dataset:

MRI was performed for 67 subjects with the Philips Achieva 3.0 T scanner in the Princes of Wales Hospital, Hong Kong. T2W and DW images were acquired according to standards that have been set by the consensus guideline. ADC images were generated using the console available in the scanner from DW images acquired with multiple b-values. The high b-value DW image was acquired with b=1600 sec/mm2 and provides better visualization of clinically significant cancers in regions adjacent to the anterior fibromuscular stroma and at the apex and base of the prostate.

Scanning parameters are summarized in Table 1. A radiologist with six-year experience in prostate imaging segmented regions suggestive of prostate cancer and categorized each region according to the Prostate Imaging-Reporting and Data System, version 2 (PI-RADS v2). Patients with lesions of PI-RADS category 3, 4 or 5 underwent MRI-targeted biopsy via the transrectal route, assisted by Koelis Urostation MRI-ultrasound fusion software. The Gleason score of each lesion was obtained by histopathological analysis of the biopsy sample.

TABLE 1

|  | T2W | DWI |
| --- | --- | --- |
| TR | 3.3 s | 2.4 s |
| TE | 90 ms | 84 ms |
| Slice thickness | 3 mm | 3 mm |
| Voxel size | 0.45 × 0.45 × 3.0 mm | 1.25 × 1.25 × 3.0 mm |
| B-values used |  | 0, 100, 1000, 1600 |

SimpleITK was used to adjust relative displacement between the T2W and ADC images. The intensity of T2W and registered ADC images was linearly rescaled with the 1st and 99th percentile scaled to 0 and 1, respectively. Prostate segmentation was done using the CNN model pre-trained. The bounding box of the prostate boundary was expanded by 25% to form a region of interest (ROI). The ROI was cropped for subsequent lesion segmentation. Each slice in the ROI was resampled to a fixed size of 128×128.

Pre-Training of Networks:

Adam optimization was used in training with a learning rate of 0.0001. All CNNs were trained for 500 epochs with a batch size of 24. The training and testing were performed on Ubuntu 16.04 system with 16 GB memory, an Intel® Core™ i7-9700K CPU of 3.60 GHz and an Nvidia GeForce 2070 super graphics card of 8 GB memory.

Training Dataset Augmentation:

Data augmentation was performed in both segmentation and classification tasks by transforming the original images using the following operations: (a) Flipping: An image was randomly selected to be transformed by one of the following three flipping operations: vertical, horizontal or vertical+horizontal flipping operations. The probability of selecting each operation is ⅓. (b) Rotation: An image was rotated about the image center with an angle within the range of −5° to 5° randomly chosen from a uniform probability distribution. (c) Zoom: An image was randomly zoomed within a range of [0.95,1.05] (d) Translation: An image was translated along the x- and y-axes by distances ranging from 0 to 5 pixels. The x and y-translations were randomly chosen from independent uniform probability distributions. (e) Shear Intensity: An image was fixed on an axis and stretched with a shear intensity of 0.05.

Evaluation Metrics and Statistical Analyses for Lesion Segmentation:

The lesion segmentation performances were evaluated by the Dice similarity coefficient (DSC), sensitivity and specificity, as defined below:

$$DSC = \frac{2|A \cap M|}{|A| + |M|}$$

$$\text{Sensitivity} = \frac{|A \cap M|}{|M|}$$

$$\text{Specificity} = \frac{|A^c \cap M^c|}{|M^c|}$$

where A and M are the algorithm-generated and the manual segmentation masks, respectively. |.| measures the area of region. $X^c = I/X$, where I is the domain of the image being segmented.

Evaluation Metrics and Statistical Analyses for Lesion Classification:

The precision, recall and F1-score were computed for each of the five Gleason Grade Group. The overall macro-average for these three metrics, classification accuracy and the quadratic weighted kappa coefficient K were used to evaluate each CNN. K adjusts for class imbalance and the random agreement between the classifier outputs and the ground truth labels. The weighted K penalizes inaccurate prediction according to a weight determined by how far off the prediction is. This property is desirable for the evaluation of classification performance if classes are ordinal, such as the Gleason Grade Group in this study.

Figure 7:
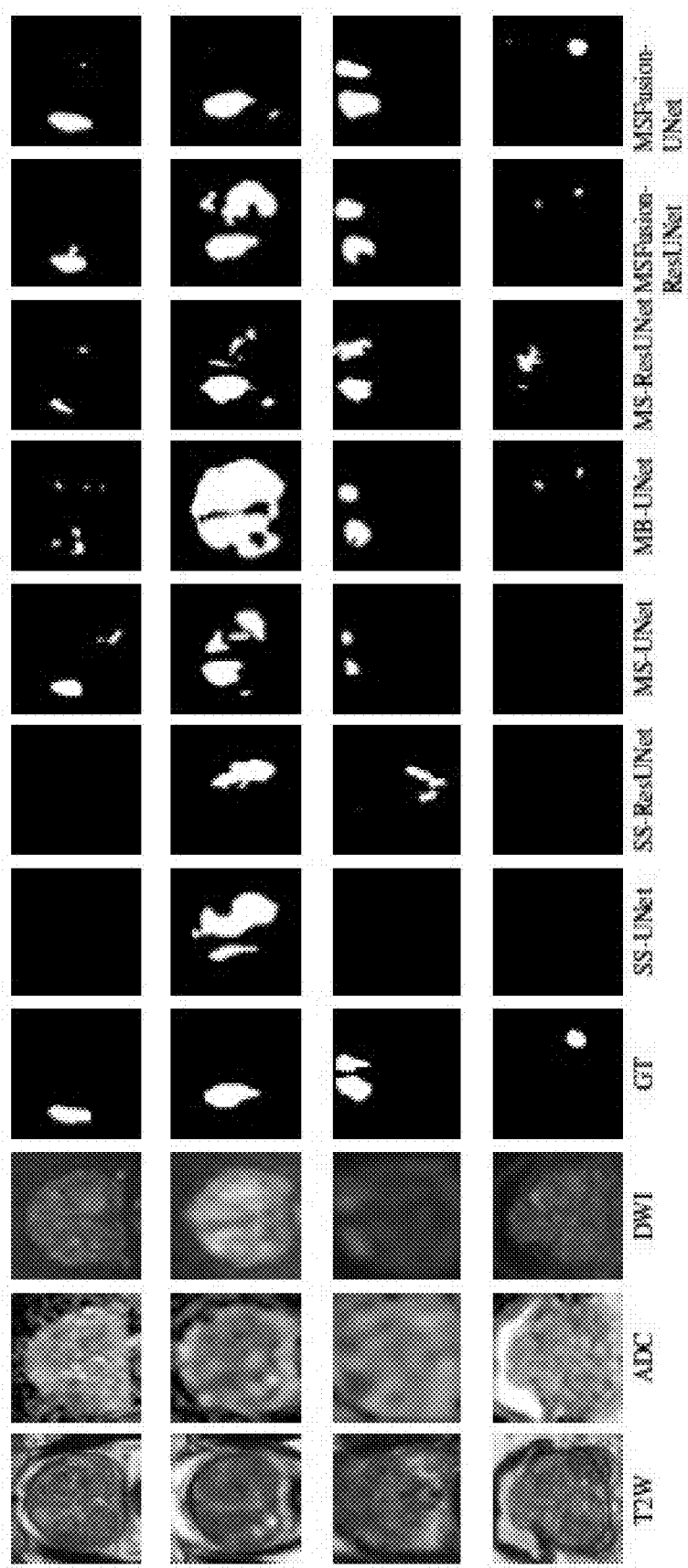
FIG. 7 shows exemplary lesions segmented by different methods.

Evaluation Results for Lesion Segmentation Performance of Deep Learning Architectures:

A total of 258 registered transverse prostate images from the 67 patients were available in the dataset. 50% of the available data was randomly selected for training and 50% was selected for testing on patient basis (129 slices from 33 patients for training and 129 from 34 patients for testing). Table 2 shows the performance metrics for the above-said seven deep learning models. These metrics were obtained by comparison with the lesion boundaries manually segmented by the more experienced radiologist. The multistream version of UNet and ResUNet have substantially higher DSC and sensitivity compared to the corresponding single-stream version. The incorporation of the fusion encoder in the multistream UNet and ResUNet has further improved the DSC and sensitivity of these two networks. This observation highlights the flexibility of the proposed multistream fusion encoder, which can be easily embedded into CNN with different architectures to improve segmentation performance. FIG. 7 shows example lesions segmented by different methods.

TABLE 2

|  | SS-UNet | SS-ResUNet | MS-UNet | MSFusion-UNet | MS-ResUNet | MSFusion-ResUNet | MB-UNet | Rad-2 |
| --- | --- | --- | --- | --- | --- | --- | --- | --- |
| *DSC | 48.2 | 50.1 | 58.3 | 66.0 | 55.2 | 64.1 | 49.8 | 76.8 |
| *Sensitivity | 42.7 | 39.2 | 59.1 | 80.6 | 54.1 | 70.9 | 71.2 | 82.1 |
| *Specificity | 98.3 | 99.1 | 97.8 | 96.8 | 97.9 | 97.5 | 94.3 | 98.5 |

*DSC, sensitivity and specificity are expressed in percent.

MSFusion-UNet provided more accurate segmentation than other methods, especially for smaller lesions. Comparison of the results generated by MS-UNet and MB-UNet show that MB-UNet has a higher sensitivity but a lower DSC and specificity, which suggests over-segmentation by MB-UNet. A possible explanation is that early concatenation in MB-UNet may have captured all suspicious regions shown in any of the three modalities. In contrast, each modality was processed by an individual encoder-decoder pair in the present multistream architecture. Pixel-wise classification based on the three feature maps generated by individual decoders allowed better discrimination between normal and cancerous tissues.

An evaluation was performed to investigate how the adaptive weighting property of the fusion encoder affects the lesion segmentation performance of the MSFusion-UNet and MSFusion-ResUNet. The MSFusion-UNet and MSFusion-ResUNet were evaluated a second time, but with $\alpha$, $\beta$ and $\gamma$ fixed at ⅓. Table 3 shows that the adaptive weighting property improved the corresponding networks in all three metrics.

TABLE 3

| model | weighting factor | *DSC | *Sensitivity | *Specificity |
|---|---|---|---|---|
| MSFusion-UNet | fixed | 60.8 | 78.2 | 96.1 |
|  | learnable | 66.0 | 80.6 | 96.8 |
| MSFusion-ResUNet | fixed | 59.1 | 70.3 | 96.6 |
|  | learnable | 64.1 | 70.9 | 97.5 |

*DSC, sensitivity and specificity are expressed in percent.

Comparison of the Present MSFusion-UNet Architecture with the Second Radiologist:

The eighth setting (Rad-2) listed in Table 2 evaluates the boundaries segmented by a second observer, with the more experienced radiologist's segmentation considered as the surrogate ground truth. The second observer is a subspecialist genitourinary radiologist with one year of experience in segmenting regions suggestive of prostate cancer. The metrics shown in Table 2 shows that the segmentation by the second radiologist better matched that of the first radiologist than the proposed MSFusion-UNet. In particular, the sensitivity [as defined in Eq. (5)] attained by the second radiologist was slightly higher than MSFusion-UNet. However, out of the 45 lesions in the test set manually identified by the more experienced radiologist, the second radiologist missed six lesions entirely and four lesions on at least one axial image (referred to as partial miss hereafter). Out of the six lesions missed entirely, three were clinically significant with Gleason scores 3+3, 4+3 and 5+5. Out of the four lesions missed partially, three were clinically significant with Gleason scores 3+3, 3+4 and 4+4. In contrast, only three lesions were missed entirely and one missed partially by MSFusion-UNet. Only one lesion missed entirely was clinically significant with a Gleason score of 3+4. This suggests that for lesions that the second radiologist was able to identify, his segmentation matched better with the surrogate ground truth than MSFusion-UNet, as demonstrated by the 10% difference in the DSC. However, the second radiologist missed more clinically significant lesions than the MSFusion-UNet.

Figure 8:
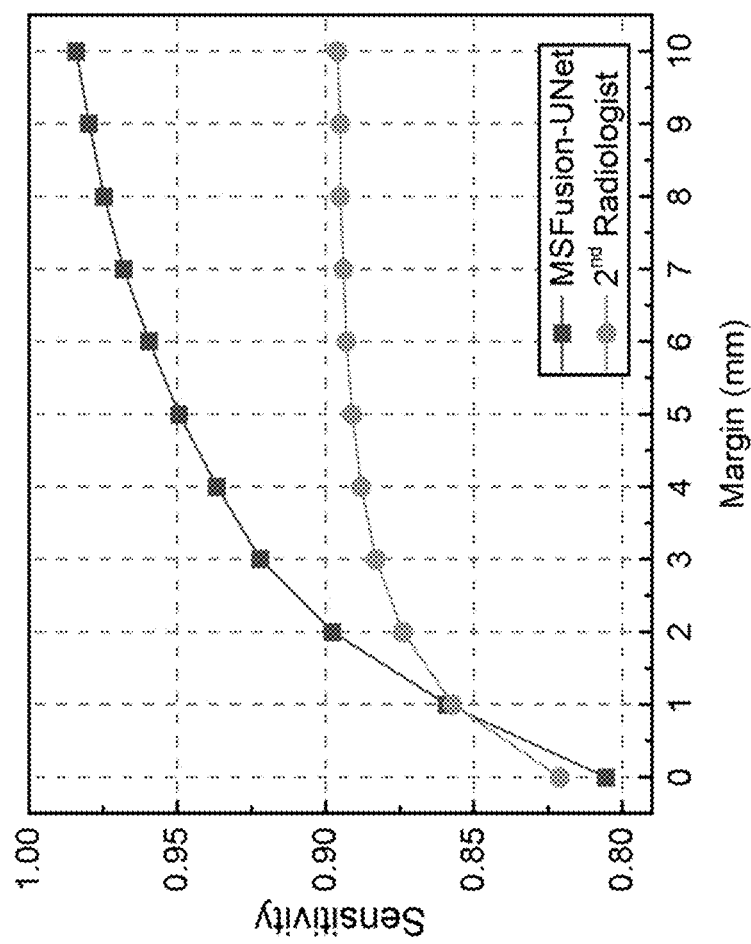
FIG. 8 depicts difference in sensitivity of the segmented lesions expanded from 1-10 mm attained by the present segmentation method compared to a conventional manual segmentation by radiologist.

In addition to comparing the sensitivity of the second radiologist and the present MSFusion-UNet, it was also investigated that how adding a margin of 1 mm to 10 mm to the segmented region would improve sensitivity. Margin adding is a clinical practice applied in focal therapy and biopsies. As MRI was found to underestimate the size of the prostate lesion, adding a margin to the segmentation region would ensure that focal treatment covers most of the lesion (e.g., 95%). FIG. 8 shows the relation between sensitivity and margin added for MSFusion-UNet and the second radiologist, respectively. Although the sensitivity for the second radiologist was slightly higher than MSFusion-UNet with no margin added, the sensitivity for the second radiologist does not improve beyond a margin of 3 mm and the sensitivity was 89.6% with a margin of 10 mm. In contrast, the sensitivity of the proposed algorithm increases more with margin added and the sensitivity reaches 98.4% with a margin of 10 mm. This suggests that the proposed MSFusion-UNet segmentation could identify more lesions than human reviewers.

Figure 9:
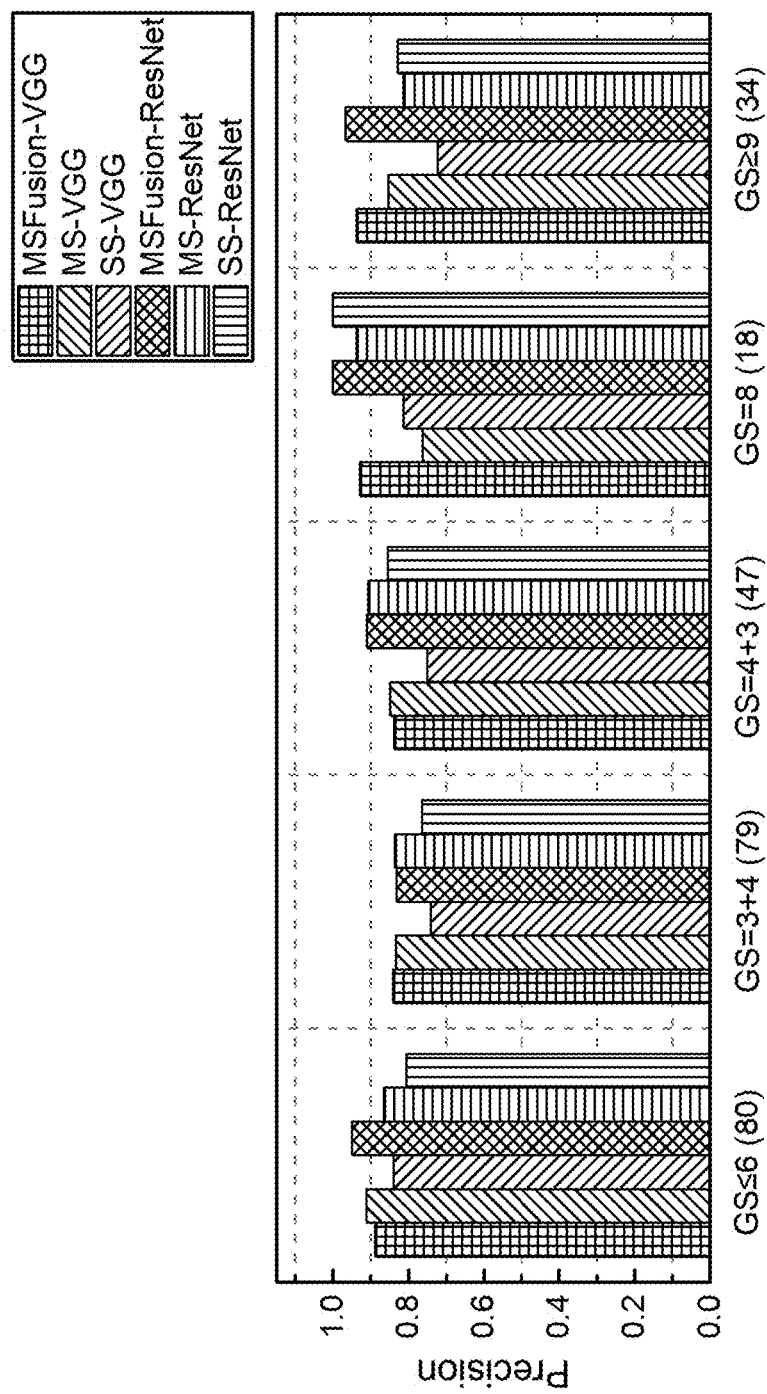
FIG. 9 depicts precision attained by six different models for each Gleason Grade Group, where parentheses enclose the number of image slices evaluated in each group.
Figure 10:
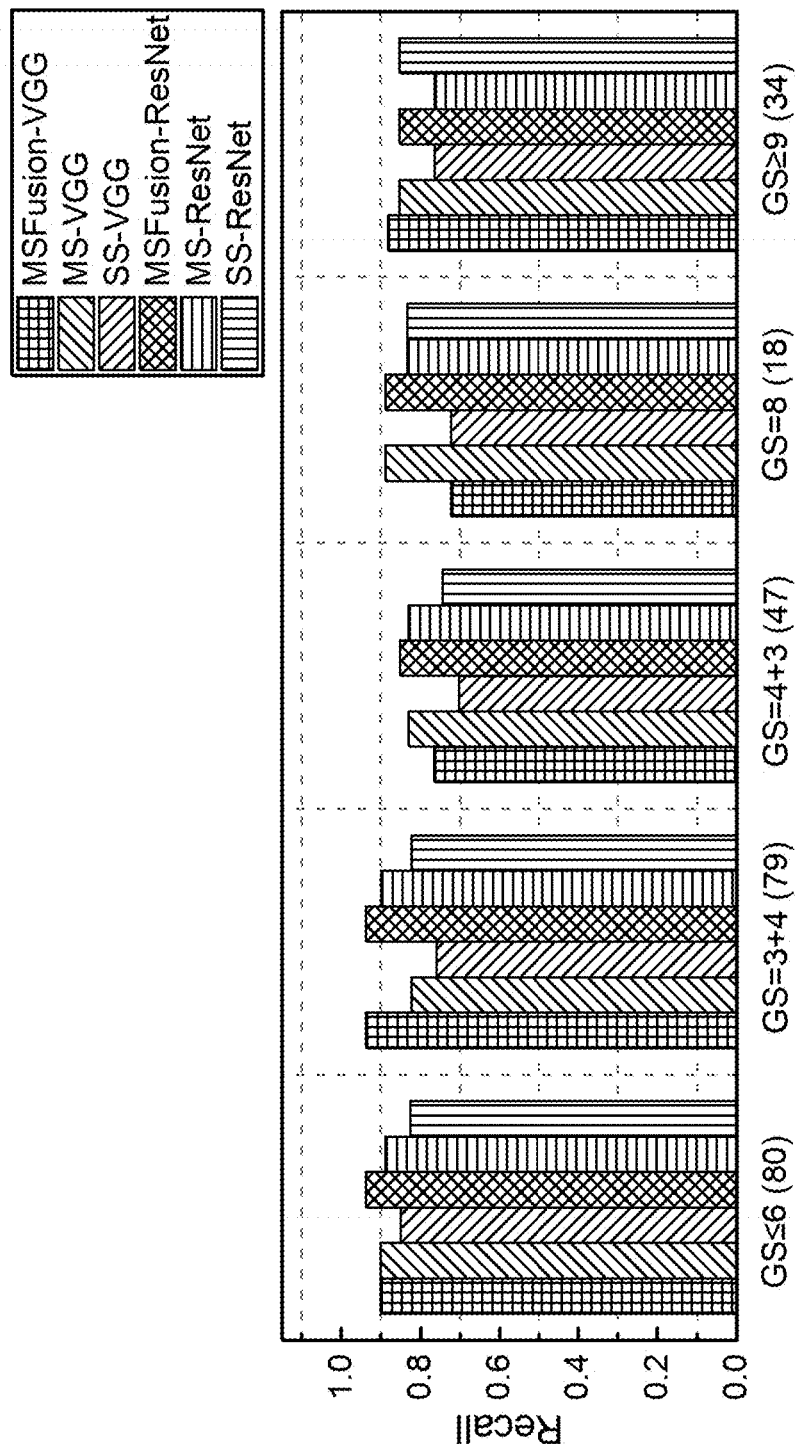
FIG. 10 depicts recall attained by six different models for each Gleason Grade Group, where parentheses enclose the number of image slices evaluated in each group.
Figure 11:
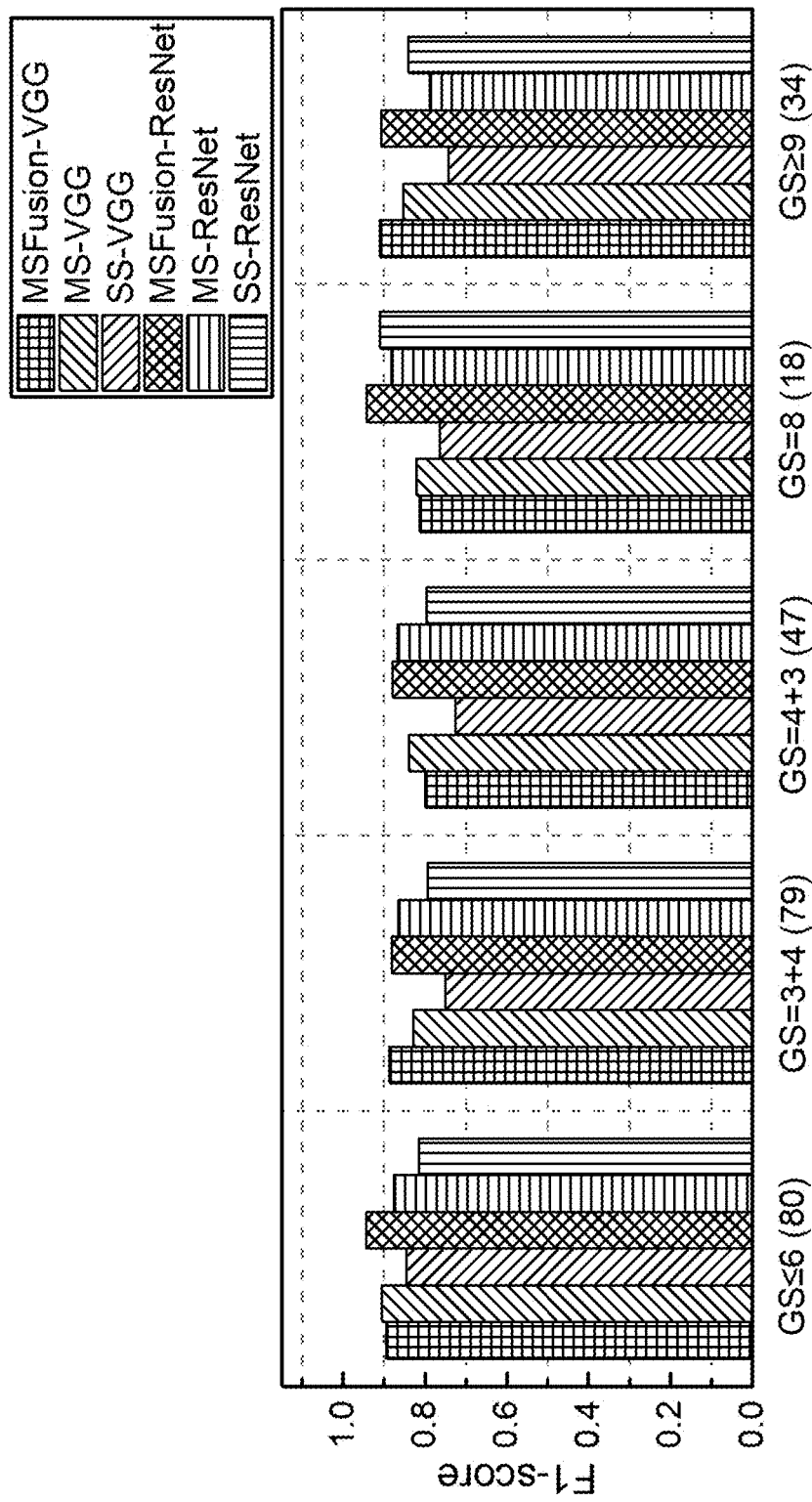
FIG. 11 depicts F1-score attained by six different models for each Gleason Grade Group, where parentheses enclose the number of image slices evaluated in each group.

Evaluation Results for Lesion Classification:

Evaluation of the classification network involves the same set of data as in segmentation evaluation. Five-fold cross-validation was performed here to provide sufficient training data in each of the five Gleason Grade Groups. FIGS. 9, 10 and 11 show the precision, recall and F1-score of the five classes, respectively, as classified by each of the above-said six experimental settings. Table 4 shows the overall accuracy, macro-averaged precision, recall, F1 and κ of the six experimental settings.

TABLE 4

| Model | Accuracy | κ | Precision | Recall | F1-score |
|---|---|---|---|---|---|
| MSFusion-VGG | 87.2 | 0.904 | 88.7 | 84.2 | 86.0 |
| MS-VGG | 85.7 | 0.845 | 84.2 | 85.9 | 84.9 |
| SS-VGG | 77.5 | 0.765 | 77.3 | 76.0 | 76.6 |
| MSFusion-ResNet | 90.7 | 0.917 | 93.1 | 89.4 | 91.0 |
| MS-ResNet | 86.1 | 0.802 | 87.2 | 84.3 | 85.6 |
| SS-ResNet | 81.4 | 0.800 | 85.0 | 81.6 | 83.1 |

Similar to lesion segmentation, multistream networks performed better than single-stream networks in classification as well. It was also demonstrated the contributions of the fusion encoder in both multistream classification networks. In particular, the accuracy attained by MSFusion-ResNet was over 90%, which is high considering that the Gleason Grade Group has five categories and that even trained radiologists are not able to reliably grade lesions.

An evaluation was performed to investigate the effect of the adaptive weighting property of the fusion encoder on lesion classification performance. The MSFusion-VGG and MSFusion-ResNet were evaluated a second time with $\alpha$, $\beta$ and $\gamma$ fixed at ⅓, and the classification results thus generated were compared with the results generated with adaptive weighting. Table 5 shows that the adaptive weighting property improved the corresponding networks in all classification metrics.

TABLE 5

| Model | Weighting factor | Accuracy | κ | Precision | Recall | F1-score |
|---|---|---|---|---|---|---|
| MSFusion-VGG | fixed | 84.9 | 0.846 | 85.5 | 84.5 | 84.9 |
|  | learnable | 87.3 | 0.904 | 88.7 | 84.2 | 86.0 |

TABLE 5-continued

| Model | Weighting factor | Accuracy | κ | Precision | Recall | F1-score |
|---|---|---|---|---|---|---|
| MSFusion-ResNet | fixed | 86.4 | 0.858 | 87.2 | 85.5 | 86.2 |
|  | learnable | 90.7 | 0.917 | 93.1 | 89.4 | 91.0 |

Computation Time:

Table 6 shows the inference time of the segmentation and classification models evaluated. While improving the lesion segmentation and classification performance substantially as presented above, the inclusion of the fusion encoder in the multistream networks involved only a small computational overhead.

TABLE 6

|  | model | Inference time (ms) |
|---|---|---|
| Segmentation | SS-Net | 27.5 |
|  | MS-UNet | 57.8 |
|  | MSFusion-UNet | 61.4 |
|  | SS-ResUNet | 44.5 |
|  | MS-ResUNet | 81.8 |
|  | MSFusion-ResUNet | 84.4 |
|  | MB-UNet | 49.9 |
| Segmentation | SS-VGG | 8.4 |
|  | MS-VGG | 14.7 |
|  | MSFusion-VGG | 19.0 |
|  | SS-ResNet | 18.3 |
|  | MS-ResNet | 34.4 |
|  | MSFusion-ResNet | 40.0 |

It should be apparent to practitioner skilled in the art that the foregoing examples of the system and method are only for the purposes of illustration of working principle of the present invention. It is not intended to be exhaustive or to limit the invention to the precise forms disclosed.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

INDUSTRIAL APPLICABILITY

The multistream fusion encoder of the present invention is light-weighted, flexible and computationally efficient, and can be easily integrated into various multistream CNNs for segmentation and classification. The encoder allows incorporating information available in T2W, ADC and high b-value DW images in lesion segmentation and classification from multiparametric prostate MR imaging and fusion of multiple streams on a layer-by-layer basis. Integration of features extracted in the T2W, ADC and high b-value DW images and propagation of improved feature maps to downstream layers benefits segmentation/classification performance. The encoder generates the output of each stream by adding the corresponding convolutional output with an adaptively weighted fusion map computed from outputs of all streams. The weight of the fusion map used to construct the output from each stream was adaptively determined by backpropagation. Adaptive weighting at each layer allows flexibility in highlighting different image modalities according to their relative influence on the segmentation/classification performance. The fusion encoder can also play an important role in the segmentation-classification workflow in biopsy and focal therapy planning. This fusion encoder can play an important role in a segmentation-classification workflow for prostate lesion diagnosis from bpMRI. Such a workflow would provide Gleason grading information from bpMRI that even a trained radiologist could not reliably obtain and would lead to a leap in patient management.

The invention claimed is:

1. A multistream neural network system, comprising:
one or more computing devices operatively coupled with one or more memory devices;
a machine learning neural network, in communication with the one or more computing devices, having machine learning tools operable to perform lesion segmentation and/or classification on a set of MRI images registered with a plurality of MRI modalities;
wherein the machine learning tools include:
a plurality of multistream fusion encoders arranged to form a plurality of encoder paths to encode the set of MRI images on a layer-by-layer basis and generate a plurality of fusion-encoded feature maps corresponding to the plurality of MRI modalities respectively;
a plurality of decoders arranged to form a plurality of decoder paths to decode the plurality of fusion-encoded feature maps on a layer-by-layer basis and generate a plurality of decoded feature maps corresponding to the plurality of MRI modalities respectively;
a plurality of intermediate classifiers arranged to form a plurality of classification paths to generate a plurality of intermediate lesion probability maps corresponding to the plurality of MRI modalities respectively; and
a final classifier configured to concatenate and compress the plurality of intermediate lesion probability maps into a combined lesion probability map and binarize the combined lesion probability map to generate a segmentation map.

2. The multistream neural network system according to claim 1, wherein each of the decoders includes:
a first 2D convolution block;
a second 2D convolution block following the first 2D convolution block; and
an up-convolution block following the second 2D convolution block.

3. The multistream neural network system according to claim 2, wherein each of the first and second 2D convolution blocks has a rectified linear unit.

4. The multistream neural network system according to claim 1, wherein each of the intermediate classifiers and the final classifier includes a 2D convolution block and a sigmoid classifier.

5. The multistream neural network system according to claim 1, wherein the machine learning tools further include the following components for prostate lesion classification:
- a series of fully-connected neurons configured to flatten, concatenate and process the plurality of fusion-encoded feature maps; and
- a multi-class classifier configured to normalize the processed fusion-encoded feature maps to a distribution of lesion probabilities and predict a Gleason grade for the set of MRI images.

6. The multistream neural network system according to claim 5, wherein the multi-class classifier is a softmax classifier.

7. An automatic method for using the multistream neural network system of claim 1 to perform lesion segmentation and/or classification on a set of MRI images registered with a plurality of MRI modalities, comprising:
- encoding, by the plurality of multistream fusion encoders, the set of MRI images on a layer-by-layer basis to generate a plurality of fusion-encoded feature maps corresponding to the plurality of MRI modalities respectively;
- decoding, by the plurality of decoders, the plurality of fusion-encoded feature maps on a layer-by-layer basis to: a plurality of decoded feature maps corresponding to the plurality of MRI modalities respectively;
- generating, by the plurality of intermediate classifiers, a plurality of intermediate lesion probability maps for the plurality of decoded feature maps respectively;
- concatenating and compressing, by the final classifier, the plurality of intermediate lesion probability maps into a final lesion probability map for the set of MRI images; and
- binarizing, by the final classifier, the final lesion probability map with a threshold to generate a segmentation map.

8. The automatic method according to claim 7, wherein the machine learning tools further include a series of fully-connected neurons and a multi-class classifier for lesion classification; and
the method further comprising:
- flattening, concatenating and processing, by one or more of the fully-connected neural layers, the plurality of fusion-encoded feature maps; and
- normalizing, by the multi-class classifier, the processed fusion-encoded feature maps to a distribution of lesion probabilities; and
- predicting, by the multi-class classifier, a Gleason grade for the set of MRI images.

9. The multistream neural network system according to claim 1, wherein each of the multiple multistream fusion encoders comprises:
- a plurality of feature extractors, each configured to extract a feature map for a corresponding MRI modality;
- a fusion map generator configured to generate a fusion map based on the plurality of extracted feature maps;
- a weighting operator configured to generate, based on the fusion map, a plurality of weighted fusion maps for the plurality of MRI modalities respectively; and
- a plurality of fusion operators, each configured to generate, based on a corresponding extracted feature map and a corresponding weighted fusion map, a corresponding fusion-encoded feature map.

10. The multistream neural network system according to claim 9, wherein the set of MRI images include a T2-weighted image, an apparent diffusion coefficient image and a diffusion-weighted imaging image acquired from a subject's prostate.

11. The multistream neural network system according to claim 9, wherein each of the feature extractors includes a first 2D convolution block and a second 2D convolution block following the first 2D convolution block.

12. The multistream neural network system according to claim 11, wherein each of the first and second 2D convolution blocks has a rectified linear unit.

13. The multistream neural network system according to claim 9, wherein the fusion map is generated by: calculating a plurality of averages along channel dimension for the plurality of extracted feature maps respectively; and adding the plurality of calculated averages.

14. The multistream neural network system according to claim 9, wherein the plurality of weighted fusion maps is generated by:
- assigning a plurality of weights to the plurality of MRI modalities respectively; and
- multiplying each of the plurality of assigned weights with a corresponding extracted feature map and the fusion map.

15. The multistream neural network system according to claim 9, wherein the corresponding fusion-encoded feature map is generated by:
- adding the corresponding weight fusion map and extracted feature map to generate an intermediate feature map; and
- performing maximum pooling on the intermediate feature map.

16. The multistream neural network system according to claim 14, wherein the plurality of weights is optimized adaptively through backpropagation.

* * * * *